United States Patent
Cheng et al.

(10) Patent No.: US 7,118,121 B2
(45) Date of Patent: Oct. 10, 2006

(54) STROLLER FRAME STRUCTURE

(75) Inventors: Huang-Yi Cheng, Chia-I Hsien (TW); Ming-Chi Tsai, Yunlin County (TW); Tse-Chien Wu, Kaohsiung (TW)

(73) Assignee: Link Treasure Limited, Tortola (VG)

( * ) Notice: Subject to any disclaimer, the term of this patent is extended or adjusted under 35 U.S.C. 154(b) by 172 days.

(21) Appl. No.: 10/801,582

(22) Filed: Mar. 17, 2004

(65) Prior Publication Data
US 2004/0222615 A1 Nov. 11, 2004

(30) Foreign Application Priority Data
May 6, 2003 (TW) .............................. 92208252 U

(51) Int. Cl.
*B62B 7/06* (2006.01)
(52) U.S. Cl. .................................. 280/642; 280/47.38
(58) Field of Classification Search ..................... None
See application file for complete search history.

(56) References Cited

U.S. PATENT DOCUMENTS

| 3,797,848 | A | * | 3/1974 | Burnham | 280/644 |
| 3,873,116 | A | * | 3/1975 | Perego | 280/650 |
| 3,989,295 | A | * | 11/1976 | Sparkes | 297/39 |
| 4,386,790 | A | * | 6/1983 | Kassai | 280/650 |
| 4,428,598 | A | * | 1/1984 | Kassai | 280/644 |
| 4,435,012 | A | * | 3/1984 | Kassai | 297/354.12 |
| RE31,760 | E | * | 12/1984 | Kassai | 280/644 |
| 4,759,566 | A | * | 7/1988 | Kassai | 280/642 |
| 4,779,879 | A | * | 10/1988 | Kassai | 280/47.36 |
| 4,817,982 | A | * | 4/1989 | Kassai | 280/644 |
| 4,828,278 | A | * | 5/1989 | Shinroku et al. | 280/644 |
| 4,846,494 | A | * | 7/1989 | Kassai | 280/642 |
| 5,524,503 | A | * | 6/1996 | Ishikura | 74/501.6 |
| 5,772,235 | A |   | 6/1998 | Espenshade |  |
| 5,823,564 | A | * | 10/1998 | Kettler | 280/642 |
| 5,871,227 | A | * | 2/1999 | Huang | 280/642 |
| 6,059,301 | A | * | 5/2000 | Skarnulis | 280/47.371 |
| 6,267,405 | B1 | * | 7/2001 | Chen | 280/647 |
| 6,464,244 | B1 | * | 10/2002 | Cheng | 280/650 |
| 6,485,216 | B1 | * | 11/2002 | Cheng | 403/102 |
| 6,626,451 | B1 | * | 9/2003 | Song | 280/642 |
| 6,692,015 | B1 | * | 2/2004 | Perego | 280/647 |
| 6,722,690 | B1 | * | 4/2004 | Lan | 280/642 |
| 6,824,161 | B1 | * | 11/2004 | Iwata | 280/642 |
| 6,851,700 | B1 | * | 2/2005 | Yoshie et al. | 280/642 |

FOREIGN PATENT DOCUMENTS

| DE | 3935108 | A1 | * | 4/1991 |
| GB | 2179897 | A | * | 3/1987 |
| GB | 2185450 | A | * | 7/1987 |
| GB | 2285775 | A | * | 7/1995 |

* cited by examiner

*Primary Examiner*—Christopher P. Ellis
*Assistant Examiner*—Christopher Bottorff
(74) *Attorney, Agent, or Firm*—Birch, Stewart, Kolasch & Birch, LLP

(57) ABSTRACT

A stroller frame structure includes a front wheel rack, a rear wheel rack, a first linkage assembly, a coupling dock, a handle tube, a release mechanism, an armrest and a second linkage assembly that are pivotally coupled with one another. The handle tube has a lower end movable to allow the second linkage assembly to drive the first linkage assembly to move downwards to form a V-shaped folding thereby to move the front wheel rack and the rear wheel rack close to each other or extend to achieve smooth folding.

8 Claims, 6 Drawing Sheets

STROLLER FRAME STRUCTURE

This utility application claims priority under 35 U.S.C. § 119(a) on Patent Application No. 092208252 filed in Taiwan on May 6, 2003, the entire contents of which are hereby incorporated by reference.

FIELD OF THE INVENTION

The present invention relates to a stroller frame structure that has a first linkage assembly pivotally bridged on a front wheel rack and a rear wheel rack, and a second linkage assembly driven by a handle tube to actuate and fold the first linkage assembly in V-shape, to move the front wheel rack and the rear wheel rack close to each other for folding.

BACKGROUND OF THE INVENTION

Conventional strollers for carrying a baby usually have a linkage bar consisting of rods pivotally engaging with one another. A release mechanism is used to control a joint assembly located at the juncture of the rods. The joint assembly has a latch mechanism which may be released or latched to collapse the stroller to a folding position or unfold the stroller to an extended position. For instance U.S. Pat. No. 5,772,235 discloses a convertible stroller. However, it has a complicated frame structure consisting of coupling linkage bars. This is quite difficult to assemble. As it has many rod elements, the total weight of the frame structure is greater. This is not easy to carry and move. Folding movement cannot be smoothly executed and could result in a troublesome operation.

SUMMARY OF THE INVENTION

In view of the problems set forth above, such as complicated frame structure and a not smooth folding operation, the present invention aims to provide a stroller frame structure that includes a front wheel rack, a rear wheel rack, a first linkage assembly, a coupling dock, a handle tube, an armrest and a second linkage assembly that are pivotally coupled with one another. The handle tube has a lower end movable by the second linkage assembly, to drive the first linkage assembly to move the front wheel rack and the rear wheel rack close to each other in the middle or are extended thereby to achieve a smooth folding operation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
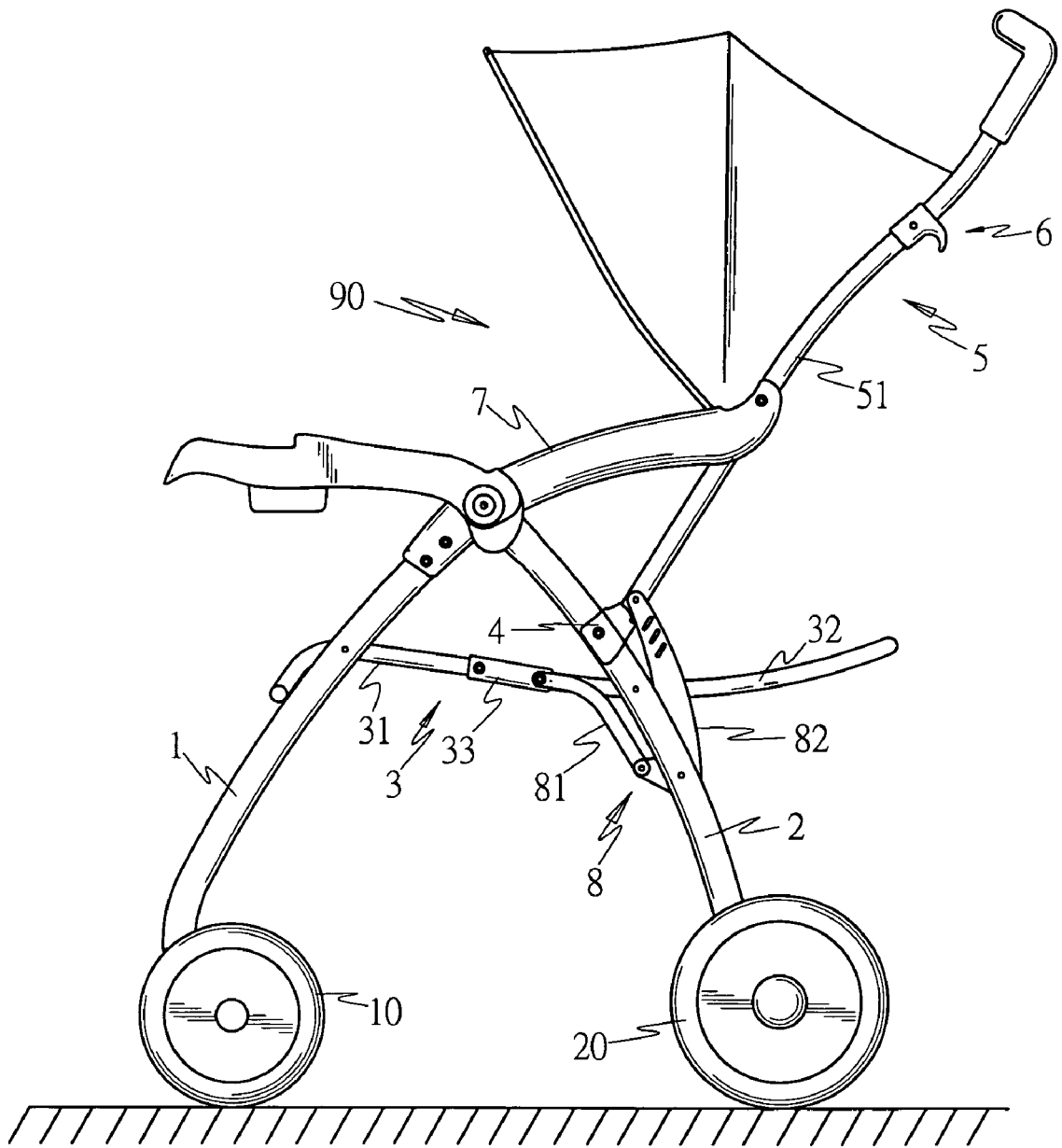
FIG. 1 is a schematic view of the invention in an extended condition.
Figure 2:
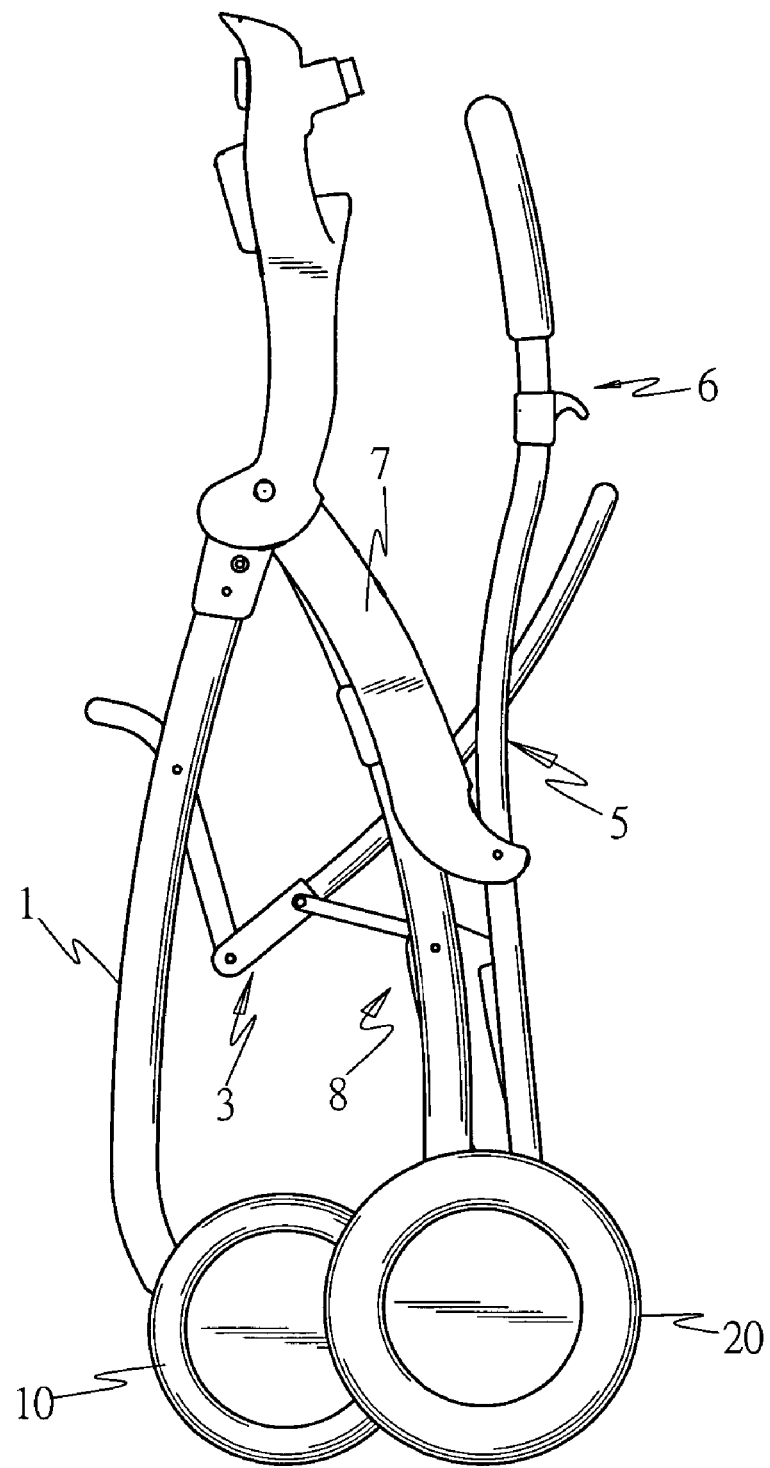
FIG. 2 is a schematic view of the invention in a folding condition.

Referring to FIGS. 1 and 2, the stroller frame structure 90 according to the invention mainly includes a front wheel rack 1, a rear wheel rack 2, a first linkage assembly 3, a coupling dock 4, a handle tube 5, a release mechanism 6, an armrest 7 and a second linkage assembly 8 that are pivotally coupled with one another. The frame structure may be in an extended condition (as shown in FIG. 1) and a folding condition (as shown in FIG. 2).

In one embodiment of the invention, the first linkage assembly includes a front seat rack bar 31 pivotally coupled with the front wheel rack 1 and a rear seat rack bar 32 pivotally coupled with the rear wheel rack 2. The front seat rack bar 31 and the rear seat rack bar 32 are pivotally bridged by pivot coupler 33 so that they can jointly form a sitting area for seating a child when extended. The front wheel rack 1 and the rear wheel rack 2 may also be folded in V-shape when the stroller frame 10 is collapsed.

The second linkage assembly 8 is pivotally coupled with the first linkage assembly 3. The second linkage assembly 8 includes a driving member 81 and a rotary member 82. The rotary member 82 pivotally bridges the handle tube 5 and a rear leg tube. The driving member 81 pivotally bridges the rotary member 82 and the first linkage assembly 3 (in this embodiment, the driving member 81 has one end pivotally coupled on the pivot coupler 33 of the first linkage assembly 3).

Figure 3:
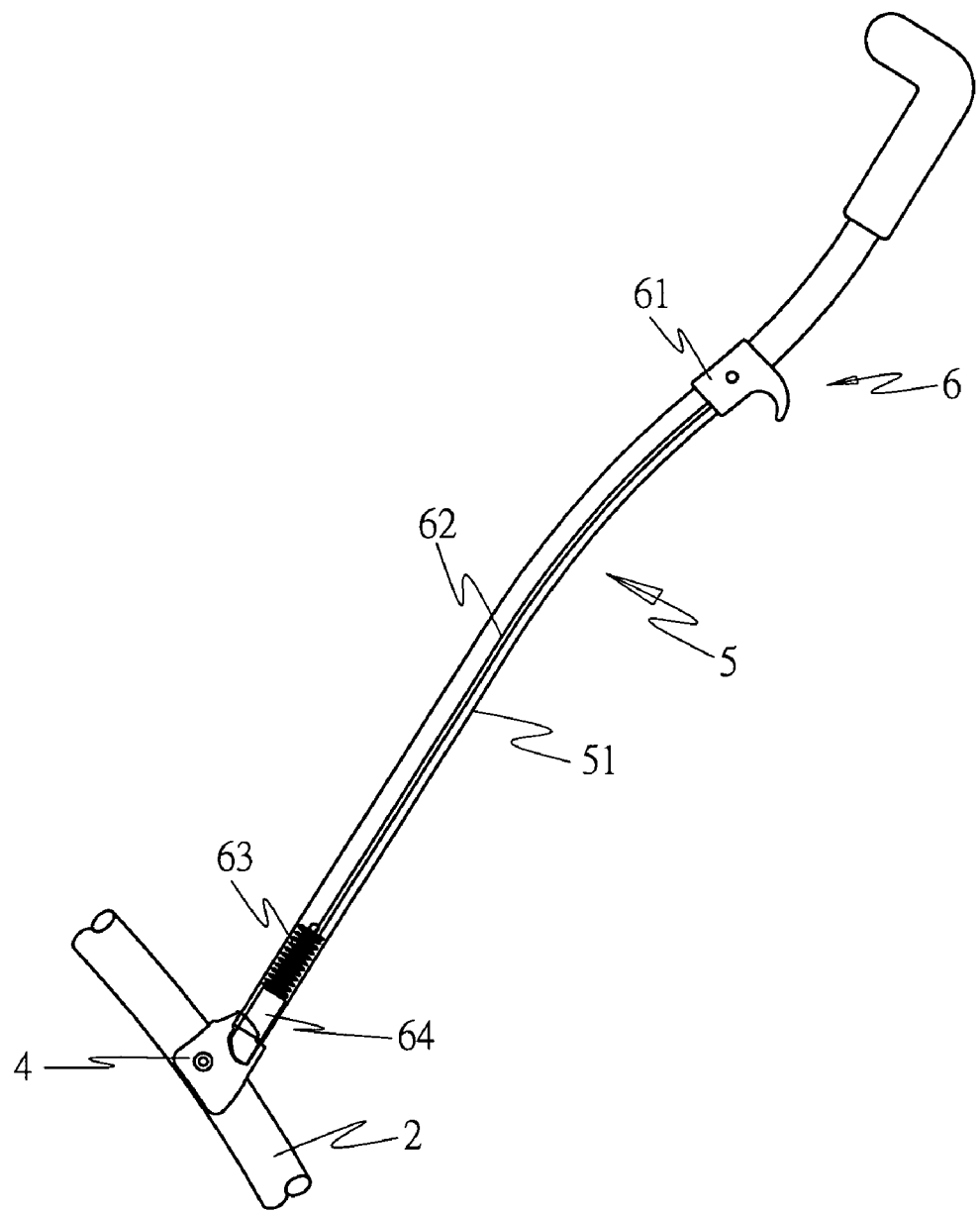
FIG. 3 is a schematic view of the release mechanism of the invention.
Figure 4:
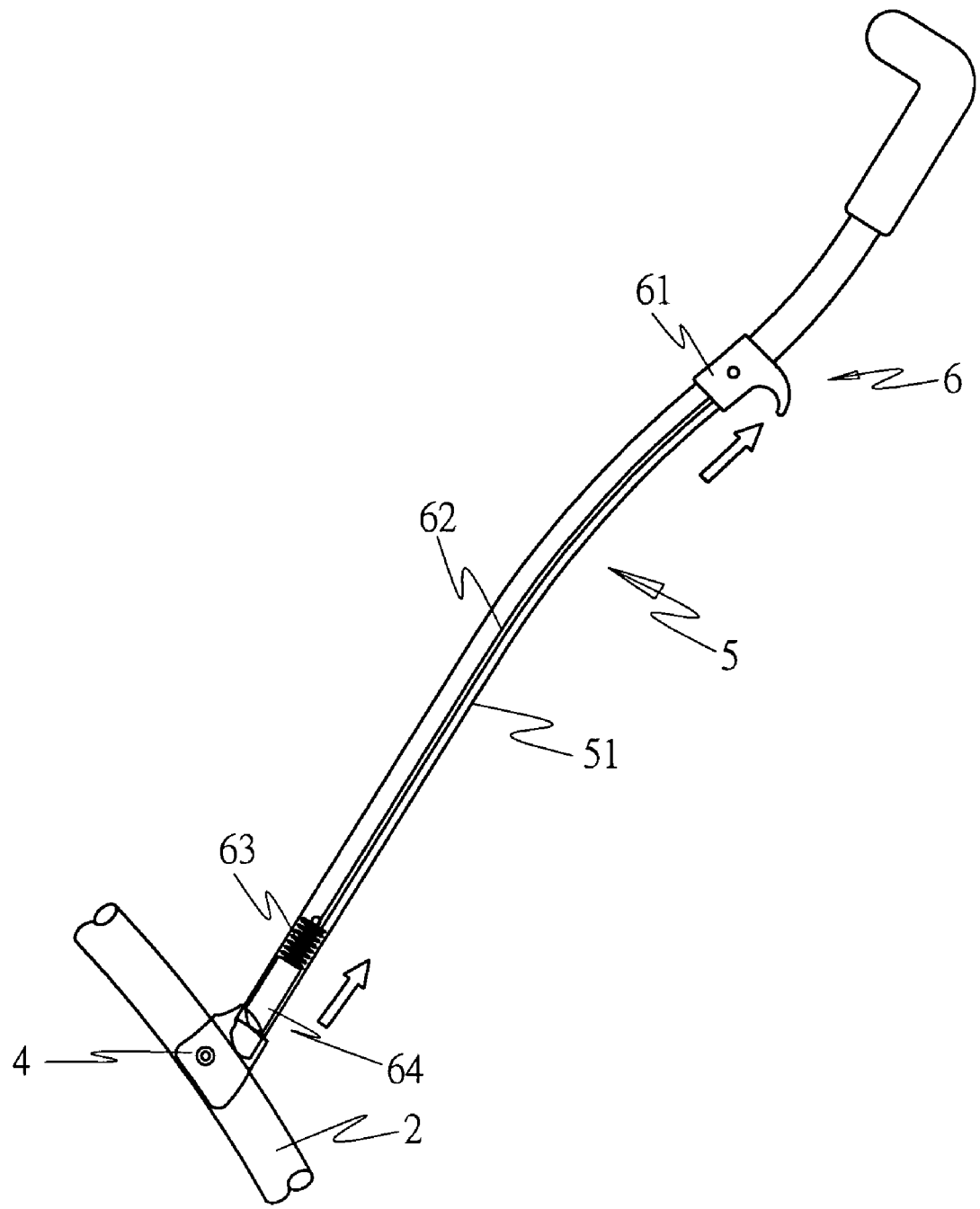
FIG. 4 is a schematic view of the release mechanism of the invention in an operating condition.
Figure 5:
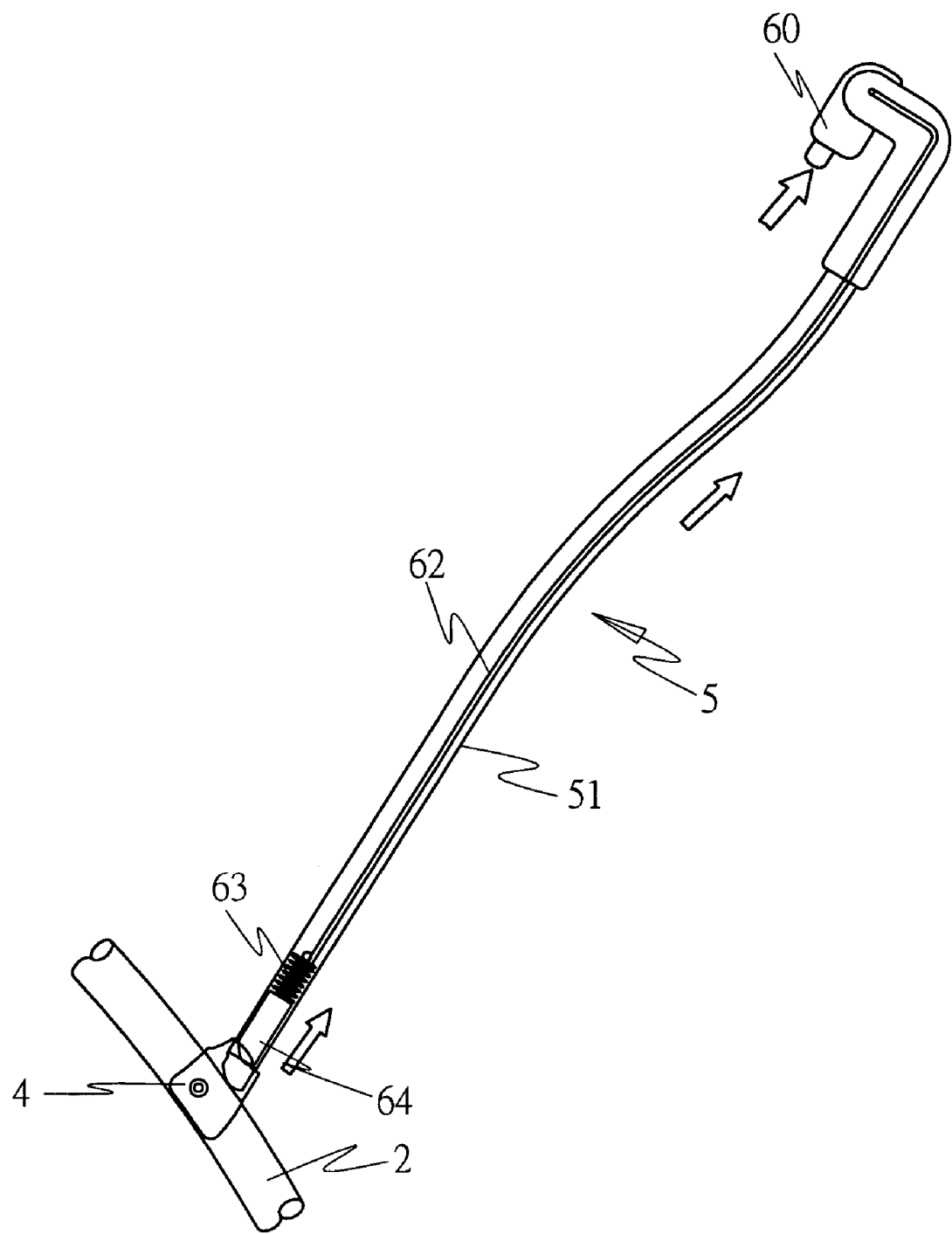
FIG. 5 a schematic view of the release mechanism of the invention coupled with a remote controller.

The handle tube 5 includes a pair of handle racks 51. The release mechanism 6 is located on the handle racks. The handle racks 51 are pivotally coupled with the armrest 7 and the rotary member 82 of the second linkage assembly 8. The handle racks 51 have a free distal end. Referring to FIGS. 3, 4 and 5, the release mechanism 6 is mounted on the handle tube 5. It includes an actuation member 61, a linkage member 62 (may be a steel bar or a flexible wire), an elastic element 63 and a latch element 64. The coupling dock 4 is fixedly mounted on the rear wheel rack 2. The latch element 64 is located on the free distal end of the handle rack 51 and connected to the actuation member 61 through the linkage member 62. The elastic element 63 can maintain the latch element 64 in a latched condition with the coupling dock 4 on the rear wheel rack 2. By pulling the actuating member 61, the linkage member 62 may be driven to move the latch element 64 away from the coupling dock 4 (referring to FIG. 4). In another embodiment, a remote controller 60 may be used to connect the linkage member 62 to operate the release mechanism single-handed (referring to FIG. 5).

Figure 6:
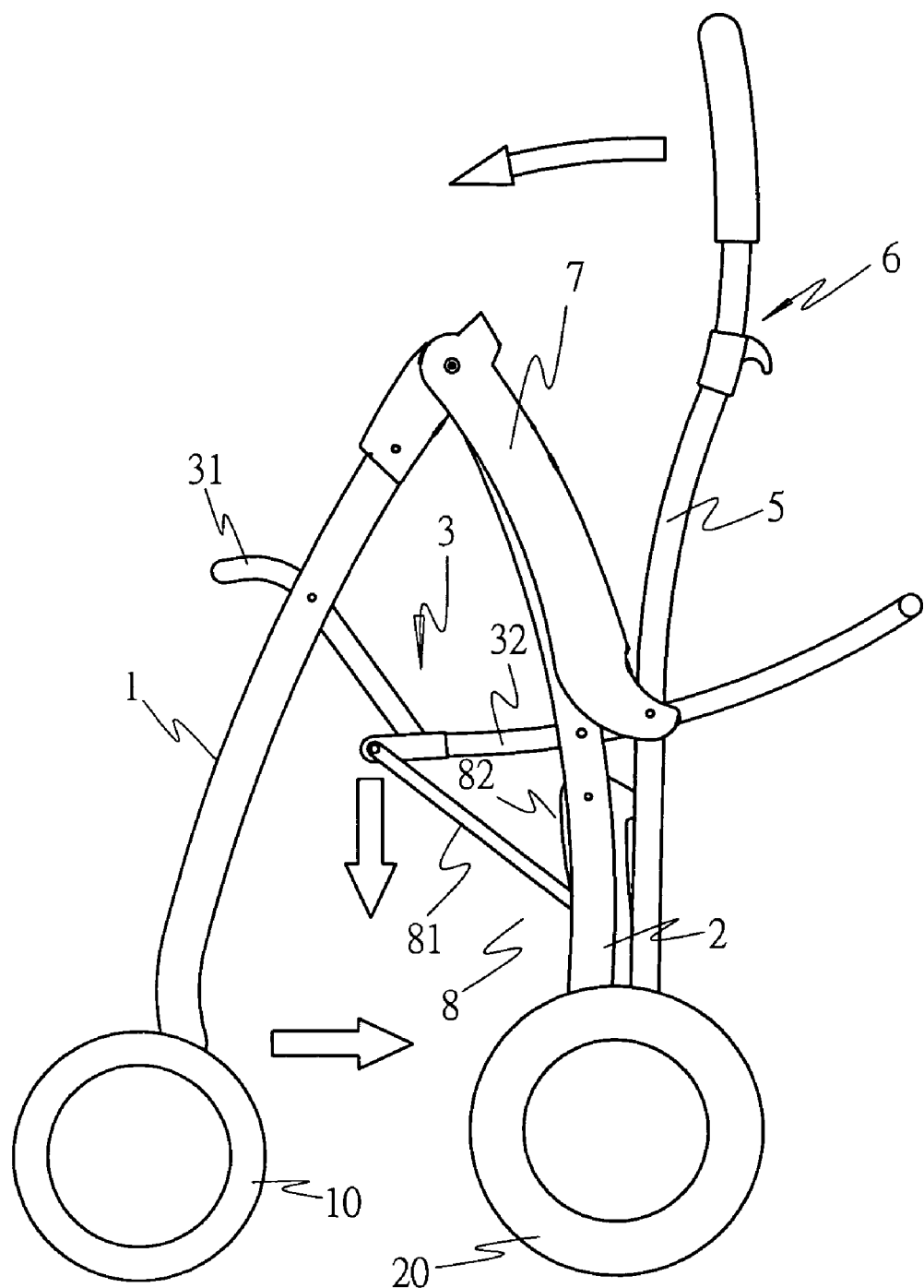
FIG. 6 is a schematic view of the invention in a folding condition.

Referring to FIGS. 1 and 6, the front wheel rack 1 has one end pivotally coupled with the armrest 7 and another end coupled with a front wheel 10 of the stroller. The front seat rack bar 31 of the first linkage assembly 3 is pivotally coupled in a middle portion between the two ends thereof.

The rear wheel rack 2 has one end pivotally coupled with the armrest 7 and another end coupled with a rear wheel 20 of the stroller. The rear seat rack bar 32 of the first linkage assembly 3, the rotary member 82 of the second linkage assembly 8 and the coupling dock 4 are pivotally coupled on the rear wheel rack between the two ends thereof. As the first linkage assembly 3 is bridged on the front wheel rack 1 and the rear wheel rack 2, the second linkage assembly 8 can drive the front seat rack bar 31 and the rear seat rack bar 32 in V-shape for folding, so that the front wheel rack 1 and the rear wheel rack 2 may be moved close to each other.

By means of the elements and construction set forth above, when the stroller frame 90 is in extended condition, the latch element 64 of the release mechanism 6 is latched on the coupling dock 4 to make the elements and rods and bars in an interlocking condition. To fold the stroller frame 90, pull the latch element 64 through the release mechanism 6 to escape the coupling dock 4, and push the handle tube 5 forwards, the rotary member 82 of the second linkage assembly 8 turns with the handle tube 5 about the pivotal point of the rear wheel rack 2 to move the driving member 81, therefore the first linkage assembly 3 are folded in V-shape, and the front wheel rack 1 and the rear wheel rack 2 are moved close to each other.

In summary, the stroller frame structure according to the invention is simply structured and very convenient. It provides a significant improvement on conventional strollers.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A stroller frame structure, comprising at least:
    a front wheel rack coupling with front wheels of a stroller;
    a rear wheel rack coupling with rear wheels of the stroller and also pivotally coupling with a first linkage assembly and a coupling dock between two ends thereof, the first linkage assembly having a free end pivotally coupling with the front wheel rack so that the front wheel rack and the rear wheel rack are movable relative to each other;
    a handle tube for moving the stroller pivotally coupled with a connection element between two ends thereof to serve as an armrest of the stroller, the armrest having one end pivotally coupled with the front wheel rack and the rear wheel rack, the handle tube being latchable on the coupling dock to form a releasable interlocking condition among the rear wheel rack, the armrest and the handle tube; and
    a second linkage assembly coupling with the handle tube and the first linkage assembly to drive the first linkage assembly when a lower end of the handle tube is moved to move the front wheel rack and the rear wheel rack close to each other in the middle for folding or extending the front wheel rack and the rear wheel rack,
    wherein the first linkage assembly includes a front seat rack bar and a rear seat rack bar, one end of the front seat rack bar and the rear seat rack bar being pivotally coupled with a pivot coupler, the front seat rack bar being pivotally coupled with the front wheel rack, the rear seat rack bar being pivotally coupled with the rear wheel rack, and the front seat rack bar and the rear seat rack bar forming a straight line when extended, and forming a V-shape when driven by the second linkage assembly and folded towards each other.

2. The stroller frame structure of claim 1, further comprising a release mechanism which includes an actuation member, a linkage member, an elastic element and a latch element, the linkage member bridging the actuating member and the latch element, the latch element being latched on the coupling dock through the elastic element to allow the entire frame structure to form an interlocking condition, and the latch element being movable away from the coupling dock through the linkage member driven by the actuation member to collapse the frame structure in a folding condition.

3. The stroller frame structure of claim 2, wherein the linkage member is a steel bar.

4. The stroller frame structure of claim 2, wherein the linkage member is a flexible wire.

5. The stroller frame structure of claim 2, wherein the actuation member is replaced by a remote controller on the handle tube to drive the linkage member to control latching and releasing of the latch element and the coupling dock.

6. The stroller frame structure of claim 1, wherein the second linkage assembly includes a rotary member and a driving member, the rotary member being pivotally coupled with the rear wheel rack and having two ends coupled with the handle tube and the driving member, the driving member bridging the first linkage assembly and the rotary member, and the rotary member being turnable to drive the first linkage assembly downwards for folding.

7. The stroller frame structure of claim 6, wherein the driving member has one end coupled with a pivotal coupler.

8. The stroller frame structure of claim 6, wherein the driving member has another end coupled with a front seat rack bar or a rear seat rack bar.

* * * * *